United States Patent

[11] 3,536,087

| [72] | Inventor | Clifford W. Allen<br>Lexington, Kentucky |
|---|---|---|
| [21] | Appl. No. | 743,505 |
| [22] | Filed | July 9, 1968 |
| [45] | Patented | Oct. 27, 1970 |
| [73] | Assignee | Westinghouse Air Brake Company<br>Wilmerding, Pennsylvania<br>a corporation of Pennsylvania |

[54] CONTROL VALVE DEVICE
9 Claims, 7 Drawing Figs.

[52] U.S. Cl.................................................. 137/82,
137/609
[51] Int. Cl..................................................... F15b 5/00,
G05d 16/00
[50] Field of Search........................................... 137/82,
624.14, 84, 609; 235/201(ME)

[56] References Cited
UNITED STATES PATENTS

| 3,056,416 | 10/1962 | Eynon | 137/82 |
| 3,426,970 | 2/1969 | Hedlund | 137/82X |

*Primary Examiner*—Alan Cohan
*Attorneys*—Adelbert A. Steinmiller and Ralph W. McIntire Jr.

ABSTRACT: A control valve device in which a pivotally mounted valve control plate is selectively operable, either manually or by low pressure control jets impinging fluid on a vane, from either one of two positions to the other to close a respective one of a pair of bleed passages each communicating with one of a pair of delivery ports connected to a common supply.

CLIFFORD W. ALLEN
INVENTOR.

BY Ralph W. McInters, Jr.
ATTORNEY

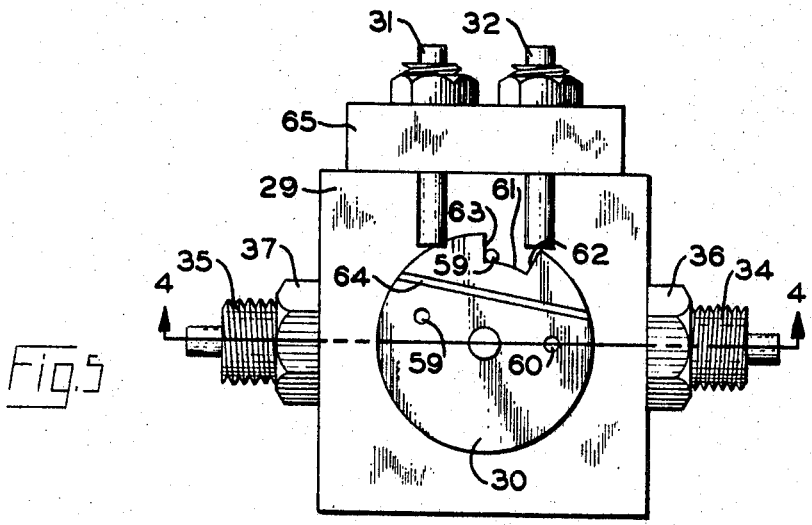
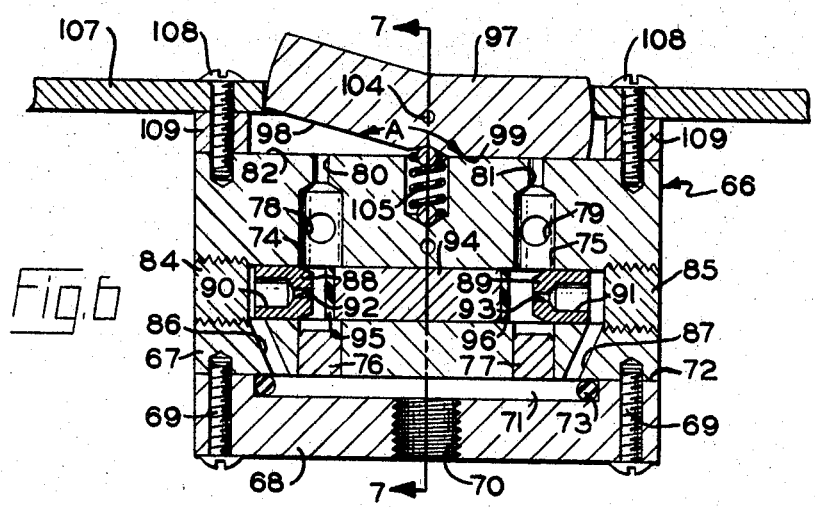
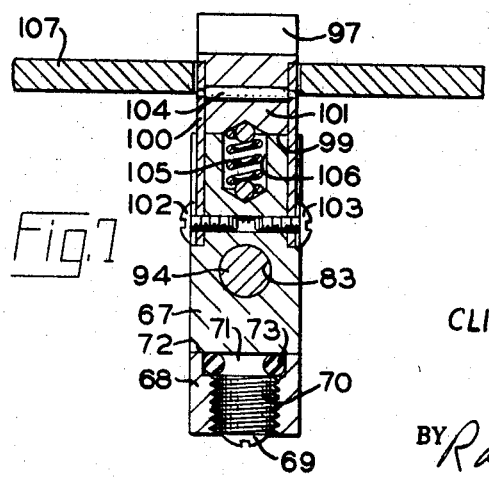
CLIFFORD W. ALLEN
INVENTOR
BY Ralph W. McIntire, Jr.
ATTORNEY

CONTROL VALVE DEVICE

BACKGROUND OF INVENTION

Heretofore, in most fluid pressure control valve devices, whether of the on–off type or pressure graduating type, the mechanical force required to operate the control valve device usually increases with the increase in pressure being controlled. Even in balanced valves where fluid loads are substantially constant with pressure, the frictional forces within the control valve generally increase with increase in controlled pressure due to the necessity of using some type of seal.

With the increasing use of pure fluid devices in industrial fluid pressure circuitry, there has arisen the need for an intermediate or pilot valve device as the power link between the conventionally low pressure output of a pure fluid device or fluidic circuitry and high fluid pressure circuit such as, for example, as utilized to actuate a power cylinder. Since low pressure operation of pure fluid devices is made possible by the elimination of moving parts and wear points which in turn eliminate maintenance, friction, and the need for lubrication, it is proposed to utilize as many of the aforementioned advantageous characteristics as possible in the construction of a pilot valve which can control high pressure circuitry in response to low pressure control force as provided by pilot valve means.

SUMMARY OF THE INVENTION

It is the object of this invention to provide a low friction pilot valve device responsive to low input pressure to control a high fluid pressure system.

In the present invention this object is achieved by providing in a body member a pair of delivery passages communicated with a common supply passage, each delivery passage having a bleed passage opening at a port on an exterior surface of the body member, which surface is common to both bleed ports. A proximity plate means is disposed on the aforementioned common exterior surface so as to freely float a small distance above the surface on a cushion of fluid escaping from the bleed ports. The proximity plate is pivoted relative to the body member for selective movement to either one of two pivotal positions, each position opening a different one of the pair of bleed ports while simultaneously closing the other.

In one embodiment of the invention, the proximity plate means comprises a single plate disposed for rotation about an axis perpendicular to the common surface, and includes a vane extending across the paths of two selectively operable fluid jets which impinge fluid on the vane to selectively position the plate in either of two rotative positions to dispose a different one of two through ports in the plate in registration with a different one of the bleed ports.

In another embodiment, the proximity plate is disposed to pivot about an axis parallel to the common surface, and includes two proximity plate surfaces, one on each side of the pivot, and intersecting at an angle less than 180° so that selective movement of either proximity plate surface to close the corresponding bleed port in response to a light mechanical force raises the other surface to open the other bleed port. A double acting overcenter toggle mechanism provides a light bias to provide a snap action of the plate to whichever one of the two positions the plate is urged by the application of manual force.

This and other objects will become more readily apparent in the following description, taken with the drawing, in which:

FIG. 5 is a top plan view of the control valve device of FIG. 4;

FIG. 6 is a cross-sectional view of a control valve device showing another embodiment of my invention; and FIG. 7 is a cross-sectional view of the control valve device of FIG. 6, taken substantially along the line 7–7.

Figure 1:
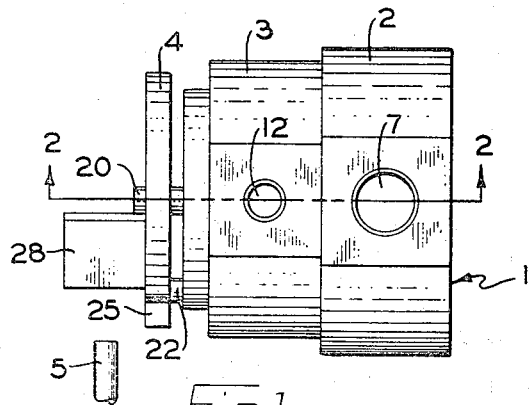
FIG. 1 is a front elevational view of a control valve device, showing my invention.
Figure 2:
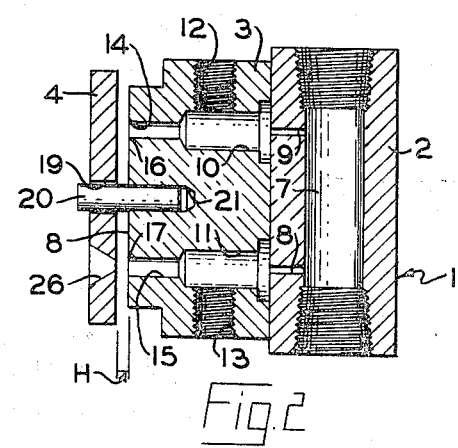
FIG. 2 is a cross-sectional view of the control device of FIG. 1, taken substantially along the line 2–2.
Figure 3:
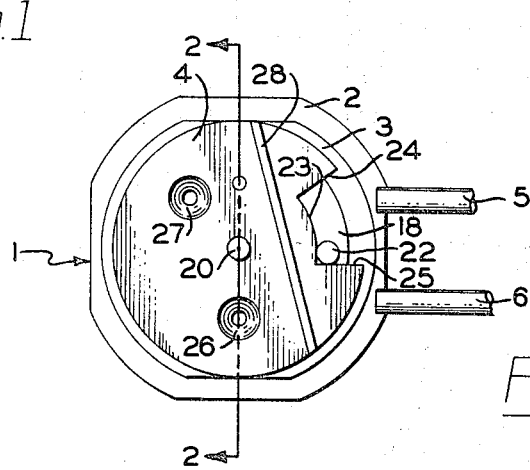
FIG. 3 is a top plan view of the control valve device as shown in FIG. 1.

Referring now to FIGS. 1, 2 and 3 of the drawing, there is shown a control valve device, generally indicated at 1, and comprising a pair of members 2 and 3 mutually attached in any suitable manner, not show, to comprise a unitary body member, a proximity plate member 4 pivotally attached to the exterior of the unitary body member, and a pair of pipes 5 and 6 for providing control jets to position the proximity plate about its pivot.

The body member 2 is generally cylindrical in form and includes therein a main supply passage 7 adapted at its ends for attachment to a common source of supply, not shown. A pair of auxiliary supply passages 8 and 9 open at one face of the body.

The body member 3 is generally cylindrical in form and includes a pair of delivery passages 10 and 11 axially registering with the auxiliary supply passages 9 and 10, respectively, which delivery passages include delivery ports 12 and 13, respectively, opening on opposite sides of the body member 3. A pair of bleed passages 14 and 15, respectively, open at bleed ports 16, 17, respectively, at one end surface 18 of the body member 3. It is to be noted that the minimum diameters of the bleed passages 14 and 15 are equal and are preferably several times larger than the diameter of auxiliary supply passages 9 and 10, so that when the bleed ports 16 and 17 are open, the pressure at the delivery ports 12 and 13 is very low.

The proximity plate 4 comprises a disc or circular plate having a central aperture 19 by which the plate is loosely disposed on the distal end of a pin 20 having other end press fitted in a bore 21 disposed perpendicularly in the surface 18 of body member 3, the diameter of the plate being such as to simultaneously completely overlie the bleed ports 16, 17. The proximity plate 4 is movable about pivot pin 30 from either one of two rotational positions to the other, which positions are determined by a pin 22 (FIG. 3) extending perpendicularly from surface 18 through a circumferentially disposed slot 23 in the plate and engageable with the slot ends 24 and 25. Proximity plate 4 includes an aperture 26 disposed to register with port 15 only when the plate is disposed in the pivotal position defined by engagement of slot end 25 with pin 22, as illustrated in FIGS. 1, 2 and 3, and an aperture 27 disposed to register with port 16 only when the plate is disposed in the other pivotal position with the slot end 24 engaging pin 22.

In order to effect selective pivotal movement of proximity plate 4 to either of the above-described pivotal positions, the plate is provided with a perpendicularly disposed vane 28 which reacts to the impingement of an appropriately directed fluid control jet stream thereon to pivot the plate about its axis within the limits defined by the pin 22 and slot 23.

In order to provide the aforementioned control jet stream the aforementioned pair of pipes 5 and 6 are disposed in a plane perpendicular to the vane 28 on either side of the pivot pin 20 so that the selective pressurization of pipes 5 and 6 will provide a jet stream engageable with the vane off the axis of pin 20 to provide a moment of force against the vane effective to pivot the plate to one or the other of the above-described two positions, depending upon which pipe is pressurized. As hereinafter described in detail, the proximity plate 4 floats above the surface 18 on a cushion of fluid so that very little force is required to effect pivotal movement thereof. Accordingly, since only very low pressure in the pipes 5 and 6 is required to effect pivotal movement, pipes 5 and 6 are representative of low pressure fluid output control signals such as may be provided directly from a conventional pure fluid device, or devices, not shown. The pipes 5 and 6 may be mounted on a separate mounting means, not shown, or on the valve device 1, in any suitable manner, not shown.

In now describing the operation of the control valve device of FIGS. 1, 2 and 3, it will be assumed that delivery ports 12 and 13 are attached to a device to be controlled, such as a power cylinder in which event ports 12 and 13 will be connected to the opposite ends of the cylinder. It will also be assumed that supply pressure is provided in supply passage 7, which supply pressure in the first instance is transmitted by way of auxiliary passages 8 and 9 to delivery passages 10 and 11 and delivery ports 12 and 13, and also to bleed passages 15, 16 and through bleed ports 16, 17 for radial exit between the surface 18 and the undersurface of proximity plate 4. It will further be assumed that control pipe 5 is pressurized to impinge a fluid jet on vane 28 and that the plate 4 is pivoted to the position shown in FIG. 3.

When the fluid under pressure in bleed passage 14 escapes through bleed port 16, it impinges upon the underside of proximity plate 4, so that the plate floats on a cushion of air in accordance with the principles described in copending application Ser. No. 677,338, filed Oct. 23, 1967 by Clifford W. Allen. Specifically, in applying the principle of the proximity plate to the present invention, it is seen that the fluid escaping from port 16 provides pressure which raises proximity plate 4 above the flat surface 18, with the exiting fluid passing radially to atmosphere from port 16 between the flat surface 18 and the underside of plate 4 causing the proximity plate 4 to float a few thousandths of an inch above the flat surface 18. This phenomenon results from an increase in the velocity in fluid as it passes between the flat surface 18 and the underside of proximity plate 4, which increase in velocity is accompanied by a decrease in fluid pressure in accordance with Bernoulli's laws of hydrodynamics, so that atmospheric pressure above proximity plate 4, being greater than the pressure between the surface 17 and 18, provides a force acting vertically downward on plate 4 tending to hold the plate against the bleed port 16. However, at the same time, the fluid pressure exiting from bleed port impinges on the underside of proximity plate 4 providing a vertically acting force opposing atmospheric force. Therefore, proximity plate 4 moves vertically away from surface 18 until these two opposing forces achieve a balance whereupon the proximity plate 4 assumes an equilibrium position at a distance H above surface 18, as best seen in FIG. 2, the distance H being exaggerated in the drawing for purposes of illustration.

When the fluid under pressure in bleed passage 15 escapes through bleed port 17, it passes uninhibited through registered aperture 26, and, since bleed passage 15 is of larger diameter than auxiliary passage 8, the pressure at delivery port 13 is very low so as to be substantially zero. Since under these conditions the effective area of bleed port 16 is the area thereof multiplied by the distance H, the bleed port 16 is substantially closed relative to open bleed port 15 so that a pressure substantially equal to supply pressure is provided at delivery port 12.

If now it is desired to eliminate pressure at delivery port 12 and apply pressure at delivery port 13, for example to reverse direction of operation of a power cylinder attached to the control valve device, pipe 5 is depressurized and pipe 6 is pressurized, thus applying a control jet to the vane 28 pivoting the floating plate 4 to the other position in which slot end 24 engages pin 22, aperture 27 registers with bleed port 14, and aperture 26 is moved away from bleed port 15, thus reversing the aforementioned pressurization of delivery ports 12 and 13.

Figure 4:
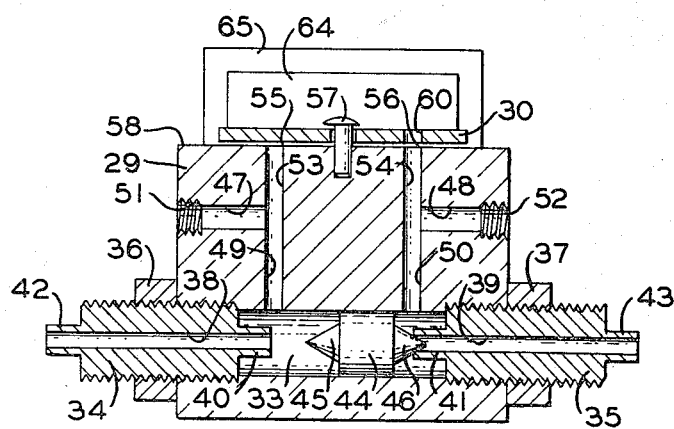
FIG. 4 is a cross-sectional view of a control valve device showing a second embodiment of my invention.

Referring now to FIGS. 4 and 5 of the drawing, there is shown a control valve device comprising a body member generally indicated at 29, a proximity plate member 30 pivotally disposed on the exterior thereof, and a pair of control pipes 31, 32 mounted on the body member 29 to control the pivotal position of the proximity plate 30.

The body member 29 includes therein a throughbore 33 having threadedly received in the opposite ends thereof a pair of pipe fittings 34, 35 fixed in position by a pair of nut members 36, 37. The pipe fittings 34, 35 each include therein through passages 38, 39, respectively, opening at the inner end 40, 41, respectively, to pressurize the throughbore 33 when the respective outer ends 42, 43 are connected to a common source of supply pressure. The inner ends 40, 41 of fittings 34, 35, respectively, are axially spaced so that the intermediate portion of the throughbore 33 therebetween serves as a pressure chamber for a shuttle valve member 44 axially movable therein and having oppositely extending conical ends 45, 46 sealingly insertable within a respective one of the ends 40, 41 of the pipe fittings, depending upon the direction of movement of the shuttle valve in the pressure passage 33. A pair of delivery passages 47, 48 are disposed in the body member 29, each having one end 49, 50, respectively, communicating at one end with an opposite end of the pressure chamber 33, and each opening at its intermediate portion at a delivery port 51, 52, respectively, disposed on opposite sides of the body 29. The other end portions of passages 49, 50, respectively, comprise bleed passages 53, 54, respectively, opening at bleed ports 55, 56, respectively, on the top surface of body member 29. Preferably the diameter of each of passages 38, 39 is smaller than the diameter of corresponding passage segments 49, 53 and 50, 54, respectively, to facilitate rapid seating of the corresponding ends 45, 46, respectively, of shuttle valve 44 when the corresponding one of bleed ports 55, 56, respectively, is opened, as hereinafter described.

The proximity plate is similar to that previously described in the embodiment of FIGS. 1, 2 and 3, and comprises a circular plate loosely disposed on a pivot pin 57 press fitted in a vertical bore on the top surface 58 of the body 29. The proximity plate 30 is pivotally movable from either one of two pivotal positions to the other, to register either of two apertures 59, 60 with bleed ports 55, 56, respectively, which positions are determined by pin 59 vertically extending from surface 58 through slot 61 in the plate periphery and selectively engageable with the slot end 62, 63. A vertically extending vane 64 on plate 30 reacts in response to the impingement of a fluid jet thereon in a direction off center of, and on one side or the other of pivot 20 to pivot the plate to one or the other of the aforementioned two positions, which fluid jets are provided by a pair of selectively pressurizable pair of pipes 31, 32 attached to the body 29 by a mounting plate 65.

From the foregoing description it is seen that the control valve device of FIGS. 4 and 5 differs over that of FIGS. 1, 2 and 3 by the addition of shuttle valve 44 movable to selectively seat its ends 45 and 46 in the supply jet end 40, 41 of the fittings 34 and 35, the purpose of which is to reduce standby fluid flow from the uncovered one of the bleed ports 55, 56 when the proximity plate is pivoted from one position to the other in the manner previously described with respect to FIGS. 1, 2 and 3 of the drawing.

In now describing the operation of the shuttle valve 44 in the control valve device of FIGS. 4 and 5, it will be seen that when bleed port 56 is uncovered or opened by appropriate positioning of the plate 30 to register aperture 60 with bleed port 56, as shown, supply pressure on the right face or end of shuttle valve 44 is low relative to the supply pressure on the left end of the shuttle valve so that the shuttle valve is moved to the right to seat its end 46 in jet end 41. Conversely, when the plate is rotated to the other pivotal position thereby opening bleed port 55 and closing bleed port 56, pressure on the left end of shuttle valve 44 drops so that the higher supply pressure on the right end of the shuttle valve moves it to the left, thereby seating shuttle valve end 45 in jet end 40 to seal off supply to delivery port 51. By this structure, fluid flow to atmosphere through whichever bleed port is uncovered, is reduced to whatever leakage exists past the shuttle valve, thereby increasing sensitivity, stability, and response time since the ports 59, 60 in the proximity plate 30 do not interrupt a high velocity stream issuing from the uncovered one of ports 55, 56 during movement of the plate from one position to the other.

Referring now to FIGS. 6 and 7 of the drawing, there is shown a control valve device generally indicated at 66 and comprising a housing 67 having a cover plate 68 attached to the lower end thereof by way of bolts 69. The cover plate includes a centrally disposed supply passage 70 therein communicating with a cavity 71 on the inner face thereof, the cavity being sealed relative to the lower end 72 of the housing 67 by way of a seal ring 73.

The housing 67 includes therein a pair of laterally spaced throughbores 74, 75, the lower ends of which are closed by way of plugs 76, 77, respectively, the intermediate portions of which are communicated to the exterior of the housing by way of delivery ports 78, 79, respectively, and the upper ends of which are necked at 80, 81, to provide respective bleed ports, communicating with the upper flat surface 82 of the housing.

The housing 67 is further provided with a transverse through bore 83 intersecting both of the previously mentioned bores 74, 75, and is closed at its ends by way of threadedly inserted plugs 84, 85. A pair of obliquely disposed passages 86, 87 communicate the ends of the bore 83 with the previously described supply cavity 71. A pair of supply valve members 88, 89 are tightly fitted in the transverse bore 83 before insertion of plugs 84, 85, and are axially spaced from the adjacent plug to provide access of fluid under pressure from supply passages 86, 87 through the bore 83. Each supply valve includes an axial supply passage 90, 91 necked at 92, 93, respectively, to provide a supply passage smaller in diameter than the previously described bleed ports 80, 81 to provide very low or substantially zero pressure in the corresponding one of the delivery ports 78, 79 when the corresponding bleed port is open to atmosphere. A shuttle valve 94 having valve seats 95, 96 on its opposite ends, is disposed in transverse bore 83 for axial movement in one direction or the other to selectively seat against the end of one supply valve member or the other depending upon which bleed port 80, 81 is open, thereby providing a preponderance of pressure on one end or the other of the shuttle valve, in the manner described above with respect to FIGS. 4 and 5 of the drawing.

In order to selectively open either of bleed ports 80, 81 while closing the other, there is provided a proximity plate member 97 having exteriorly disposed thereon a pair of flat surfaces or planes 98, 99 intersecting at an included angle A less than 180°. The proximity plate is disposed between a pair of upright support plates 100, 101 attached respectively on the front and rear surfaces of housing 67 by screws 102, 103 and is mounted for movement about a pivot pin 104 supported at its ends by the plates 100, 101 so as to dispose either surface 98, 99 in substantially flush relationship with housing surface 82 to overlie bleed ports 80, 81 respectively, while simultaneously raising the other flat surface above the housing surface 82 to open the other bleed port.

In order to facilitate snap action movement of the proximity plate member 97 about its pivot pin 104 from one position to the other, there may be provided an overcenter toggle mechanism providing a light force to snap the proximity plate member 97 to each of its two positions. The toggle mechanism includes spring 105 axially positioned in a bottom bore 106, the bottom bore being disposed midway between the bleed ports 80, 81 and vertically below the pivot pin 104. A first ball member 107 is disposed between the lower end of the spring and the conical end of the bottom bore to provide a pivot for the lower end of the spring, and a second ball member 108 is disposed between the upper end of the spring and a conical indentation in the proximity plate member 97 at the intersection of the flat surfaces 98, 99 to direct a component of spring force to urge the proximity plate 97 to whichever one of the two positions the plate is moved by the application of manual force on the exterior of the proximity plate member 97. The toggle mechanism is not necessary to the operation of the proximity plate 97, but may be added where positive snap action is desired. The strength of the spring force may be selected to provide snap action, yet not interfere with the floating action of the surfaces 98, 99 relative to the surface 82 of the housing.

In now describing the operation of the control valve device of FIGS. 6 and 7, it will be assumed that supply pressure is applied at supply port 70, which pressure is transmitted to chamber 71, supply passages 86, 87 to bore 83, through supply valves 88, 89, bores 74, 75 and delivery ports 78, 79 to a device, such as a power cylinder, not shown.

Assuming now that proximity plate 97 is disposed in the position shown, with surface 99 overlying bleed port 81, and with surface 98 disposed above bleed port 80, as shown, surface 99 floats above housing surface 82 on a cushion of fluid under pressure, in the manner previously described with respect to FIGS. 1, 2 and 3 of the drawing, so that bleed port 81 is substantially closed to provide maximum pressure to delivery port 79. At the same time, since bleed port 80 is fully opened, the pressure in bore 83 and delivery port 78 is at a minimum thereby producing a preponderance of pressure on the right end of shuttle valve 94 relative to the left end thereof so that shuttle valve 94 immediately moves leftwardly to seat end 95 against the end of supply valve 88, thereby reducing escape of standby supply pressure, in the manner described above with respect to FIGS. 4 and 5 of the drawing.

Alternatively, if manual force is applied to move the proximity plate member 97 about pivot 104 to its other position in which proximity plate surface 98 is lowered to overlie bleed port 80, and proximity plate surface 99 is raised relative to bleed port 81, it is readily seen by analogy to the operation of the device in the first instance described above, that pressure in the left end of bore 83 and delivery port 78 will rise to a maximum and pressure in the right end of bore 83 and delivery port 79 will drop to a minimum, thus reversing the pressure differential on shuttle valve 94 causing the shuttle valve to move rightwardly to seat its end 96 against the inner end of supply valve 85.

If the above-described toggle mechanism is omitted, the proximity plate member will be held in either one of its two positions by virtue of atmospheric pressure acting downwardly thereon to hold the corresponding flat surface 98, 99 in close proximity to the housing surface 82, in the manner described above with respect to FIGS. 1, 2 and 3 of the drawing.

In order to mount the control valve device in a control panel 107, screws 108 and spacers 109 are provided at the ends of housing 67.

I claim:

1. A control valve device, comprising:
   a. a housing;
   b. a pair of delivery passages in said housing;
   c. a pair of bleed passages each communicating a respective one of said delivery passages to an exterior surface of said housing;
   d. supply passage means in said housing communicating with said pair of deliver passages;
   e. pivot means disposed on said exterior surface; and
   f. proximity plate means having aperture means therethrough freely receiving said pivot means for providing selective pivotal movement of said proximity plate from either of two positions to the other to cover a different one of said pair of bleed passages in each of said two positions while simultaneously uncovering the other; and said aperture means being diametrically larger than said pivot means to provide axial movement of said proximity plate relative to said pivot means to assume a floating position above said surface on a cushion of fluid escaping from the covered one of said pair of bleed passages.

2. A control valve device, as recited in claim 1, in which said supply passage means comprises:
   a. a chamber in said housing;
   b. a pair of supply passages each communicating at a supply port with a respective one of the opposite ends of said chamber;
   c. a shuttle valve dividing said chamber into two pressure chambers and disposed for reciprocable movement in said chamber from one end to the other and return; and
   d. each of said delivery passages communicated with a respective one of said two pressure chambers.

3. A control valve device, as recited in claim 1, in which:
   a. said proximity plate is disposed for movement about a pivot; and
   b. said two positions comprising two rotative positions of said plate relative to said pivot.

4. A control valve device, as recited in claim 3, in which:

a. said pivot is disposed axially perpendicular to said surface;
b. vane means are disposed on said proximity plate reactive in response to the impingement of fluid pressure on different portions thereof to rotate said proximity plate about said pivot to selective ones of said two positions; and
c. means operable to impinge fluid pressure selectively on said different portions of said vane means are disposed adjacent said vane means.

5. A control valve device, as recited in claim 3, in which:
a. said pivot is disposed axially parallel to said surface; and
b. said proximity plate includes a pair of surfaces intersecting at an included angle less than 180° so that when either surface is disposed in said floating position relative to fluid escaping from a respective one of said bleed passages at said surface of said housing, the other surface of said proximity plate is raised relative to said floating position.

6. A control valve device, as recited in claim 5, in which overcenter toggle means is disposed between said proximity plate and said housing to provide a light force tending to snap said proximity plate into each of said two positions.

7. A control valve device, comprising:
a. a housing;
b. a delivery passage in said housing;
c. a bleed passage communicating said delivery passages to an exterior surface of said housing;
d. supply passage means in said housing communication with said delivery passage;
e. proximity plate means pivotally disposed relative to said exterior surface for selective movement from either of two positions to the other to cover said bleed passage in one of said two positions and to uncover said bleed passage in the other of said two positions;
f. said proximity plate means disposed to assume a floating position above said surface on a cushion of fluid escaping from the bleed passage when the proximity plate is disposed in said one of said two positions;
g. vane means on said proximity plate means reactive in response to the impingement of fluid pressure on different portions thereof to selectively move said proximity plate about said pivot from either of said two positions to the other; and
h. means operable to impinge fluid pressure selectively on said different portions of said vane means.

8. A control valve device, as recited in claim 7, in which, said pivot is disposed axially perpendicular to said surface.

9. A control valve device, as recited in claim 7, in which:
a. said pivot is disposed axially parallel to said surface; and
b. said proximity plate includes a pair of surfaces intersecting at an included angle less than 180° so that when either surface is disposed in said floating position relative to fluid escaping from a respective one of said bleed passages at said surface of said housing, the other surface of said proximity plate is raised relative to said floating position.